US012340950B2

(12) United States Patent
Kitahara et al.

(10) Patent No.: US 12,340,950 B2
(45) Date of Patent: *Jun. 24, 2025

(54) MULTILAYER CERAMIC CAPACITOR

(71) Applicant: Murata Manufacturing Co., Ltd., Nagaokakyo (JP)

(72) Inventors: Keita Kitahara, Nagaokakyo (JP); Yuta Saito, Nagaokakyo (JP); Noriyuki Ookawa, Nagaokakyo (JP); Riyousuke Akazawa, Nagaokakyo (JP); Takefumi Takahashi, Nagaokakyo (JP); Masahiro Wakashima, Nagaokakyo (JP); Yuta Kurosu, Nagaokakyo (JP); Akito Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/657,890

(22) Filed: May 8, 2024

(65) Prior Publication Data

US 2024/0290546 A1   Aug. 29, 2024

Related U.S. Application Data

(63) Continuation of application No. 18/218,300, filed on Jul. 5, 2023, now Pat. No. 12,009,157, which is a
(Continued)

(30) Foreign Application Priority Data

Sep. 30, 2020   (JP) .................................. 2020-166423

(51) Int. Cl.
   *H01G 4/30*   (2006.01)
   *H01G 4/008*  (2006.01)
   (Continued)

(52) U.S. Cl.
   CPC .............. *H01G 4/30* (2013.01); *H01G 4/008* (2013.01); *H01G 4/012* (2013.01); *H01G 4/1218* (2013.01)

(58) Field of Classification Search
   CPC ...... H01G 4/008; H01G 4/0085; H01G 4/012; H01G 4/1218; H01G 4/232; H01G 4/30
   See application file for complete search history.

(56) References Cited

U.S. PATENT DOCUMENTS

| 12,009,157 B2 * | 6/2024 | Kitahara ................ H01G 4/232 |
| 2016/0233027 A1 | 8/2016 | Iijima et al. |

(Continued)

FOREIGN PATENT DOCUMENTS

| JP | 2018113451 A | 7/2018 |
| JP | 2019176026 A | 10/2019 |

(Continued)

OTHER PUBLICATIONS

Kitahara et al., "Multilayer Ceramic Capacitor", U.S. Appl. No. 18/218,300, filed Jul. 5, 2023.

*Primary Examiner* — Nathan Milakovich
(74) *Attorney, Agent, or Firm* — Keating & Bennett, LLP

(57) ABSTRACT

In a multilayer ceramic capacitor, a positional deviation in a lamination direction between end portions in a width direction intersecting the lamination direction and a length direction, of two of internal electrode layers adjacent to each other in the lamination direction, is about 5 μm or less. A connection ratio N1/N0 at the middle portion thereof, and a connection ratio N2/N0 at the end portion thereof are about 90% or more, respectively, and a difference between N1/N0 and N2/N0 is about 10% or less.

18 Claims, 9 Drawing Sheets

Related U.S. Application Data continuation of application No. 17/487,349, filed on Sep. 28, 2021, now Pat. No. 11,735,368.

(51) Int. Cl.
*H01G 4/012* (2006.01)
*H01G 4/12* (2006.01)

(56) References Cited

U.S. PATENT DOCUMENTS

2020/0185152 A1    6/2020    Uchida et al.
2022/0204798 A1    6/2022    Yoshida

FOREIGN PATENT DOCUMENTS

| | | |
|---|---|---|
| JP | 2020092226 A | 6/2020 |
| JP | 2020105624 A | 7/2020 |

* cited by examiner

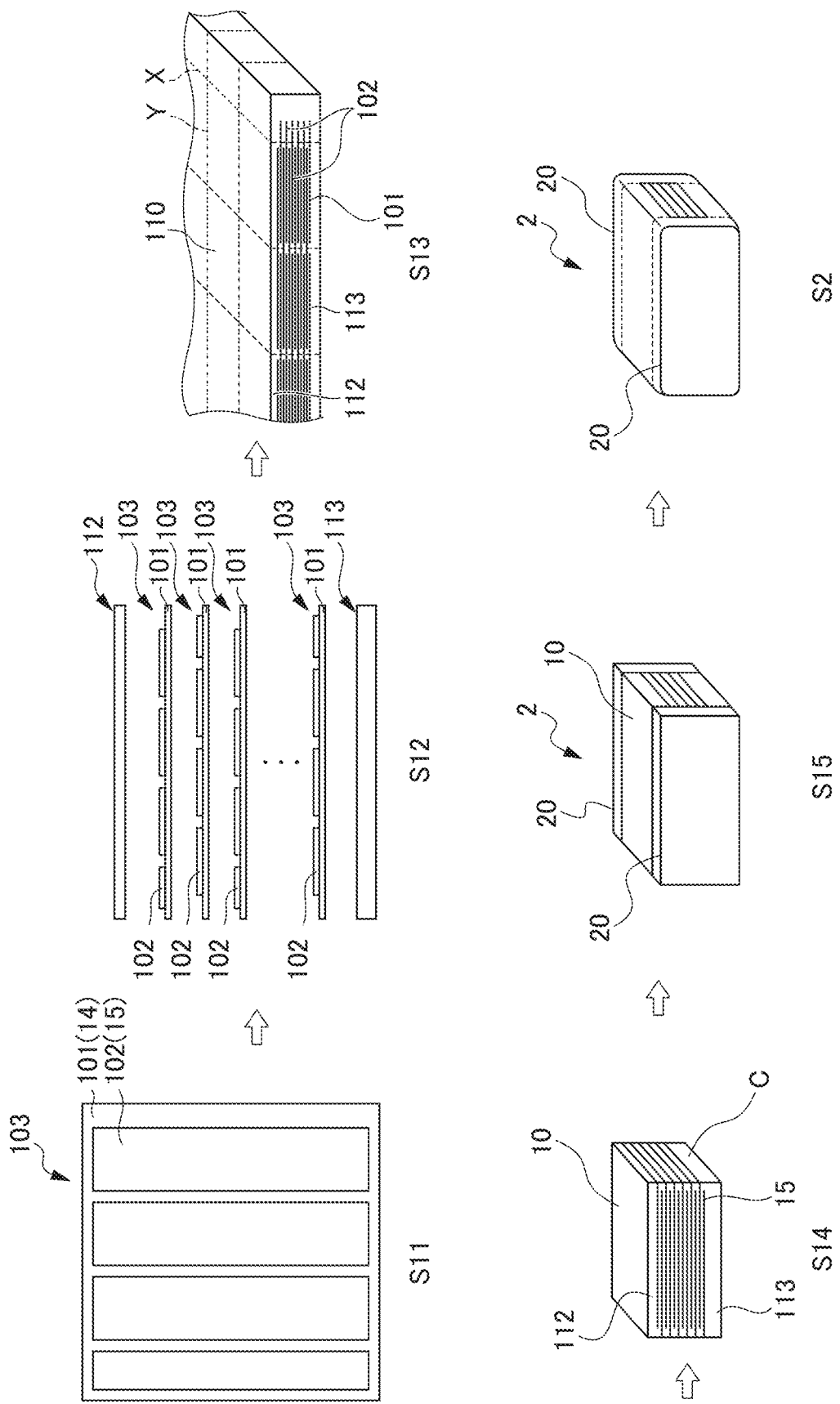

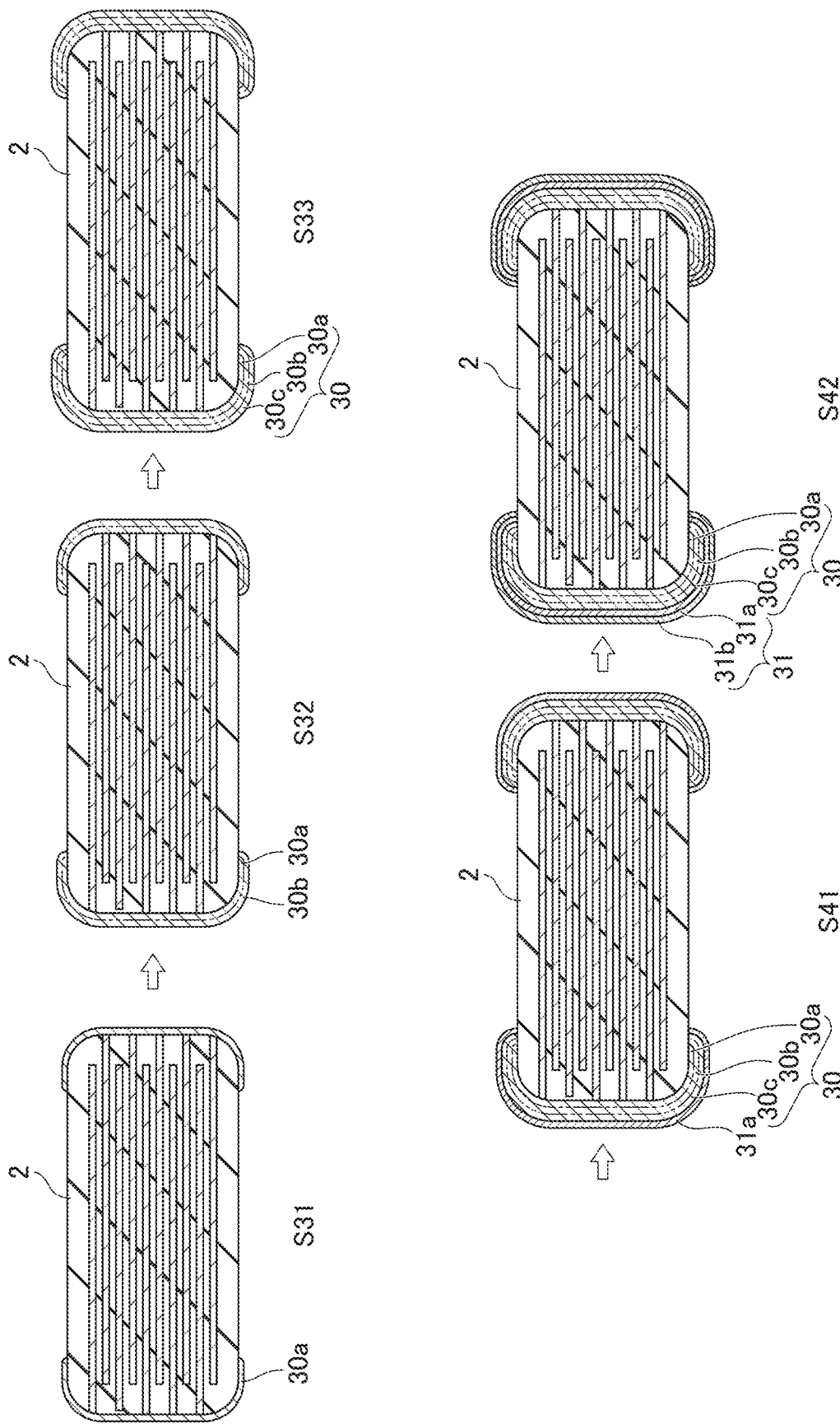

MULTILAYER CERAMIC CAPACITOR

CROSS REFERENCE TO RELATED APPLICATIONS

This application claims the benefit of priority to Japanese Patent Application No. 2020-166423 filed on Sep. 30, 2020. The entire contents of this application are hereby incorporated herein by reference.

BACKGROUND OF THE INVENTION

1. Field of the Invention

The present invention relates to a multilayer ceramic capacitor.

2. Description of the Related Art

Conventionally, a multilayer ceramic capacitor is manufactured to include external electrodes at both ends of a multilayer body including side gap portions on both side surfaces of a laminate chip including internal electrodes and dielectrics laminated therein (see Japanese Unexamined Patent Application Publication No. 2018-148117).

Such a multilayer ceramic capacitor has been required to have a larger capacitance and to be further reduced in size, and as the multilayer ceramic capacitor has a larger capacitance and further reduce in size, the thicknesses of the internal electrode layers become thinner accordingly.

When the internal electrode layers become thin, a plurality of pores are sometimes generated in the internal electrode layers.

It is preferable that the internal electrodes and the external electrodes are coupled to each other in the entire width direction. However, if the pores are generated at the connecting location therebetween, such a location in the width direction is in a non-contact state between the internal electrodes and the external electrodes.

In such a case, the contact area between the internal electrodes and the external electrodes becomes smaller, and the flow of electricity is inhibited, such that there is a possibility that the equivalent series resistance (ESR) of the multilayer ceramic capacitor increases.

SUMMARY OF THE INVENTION

Preferred embodiments of the present invention provide multilayer ceramic capacitors that each enable a favorable flow of electricity and that are each able to reduce or prevent equivalent series resistance.

A preferred embodiment of the present invention provides a multilayer ceramic capacitor that includes a multilayer body including dielectric layers and internal electrode layers alternately laminated therein, and external electrodes respectively provided on both end surfaces of the multilayer body in a length direction intersecting a lamination direction, and each connected to the internal electrode layers, wherein a positional deviation in the lamination direction between end portions in a width direction intersecting the lamination direction and the length direction, of two of the internal electrode layers adjacent to each other in the lamination direction, is about 5 µm or less, and when a number of all of the internal electrode layers extending to one of the external electrodes is defined as N0, a number of the internal electrode layers connected to the one of the external electrodes in a cross-section extending in the length direction and the lamination direction and passing through a middle portion thereof in the width direction is defined as N1, and a number of the internal electrode layers connected to the one of the external electrodes in a cross-section extending in the length direction and the lamination direction and passing through an end portion thereof in the width direction is defined as N2, a connection ratio N1/N0 at the middle portion thereof, and a connection ratio N2/N0 at the end portion thereof are about 90% or more, respectively, and a difference between the connection ratio N1/N0 and the connection ratio N2/N0 is about 10% or less.

According to preferred embodiments of the present invention, it is possible to provide multilayer ceramic capacitors that each enable a favorable flow of electricity and are each able to reduce or prevent equivalent series resistance.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a diagram for explaining a multilayer body preparing step S1 and a barrel step S2.

FIG. 9 is a diagram showing a base electrode layer forming step S3 and a plated layer forming step S4.

DETAILED DESCRIPTION OF THE PREFERRED EMBODIMENTS

Preferred embodiments of the present invention will be described in detail below with reference to the accompanying drawings.

Figure 1:
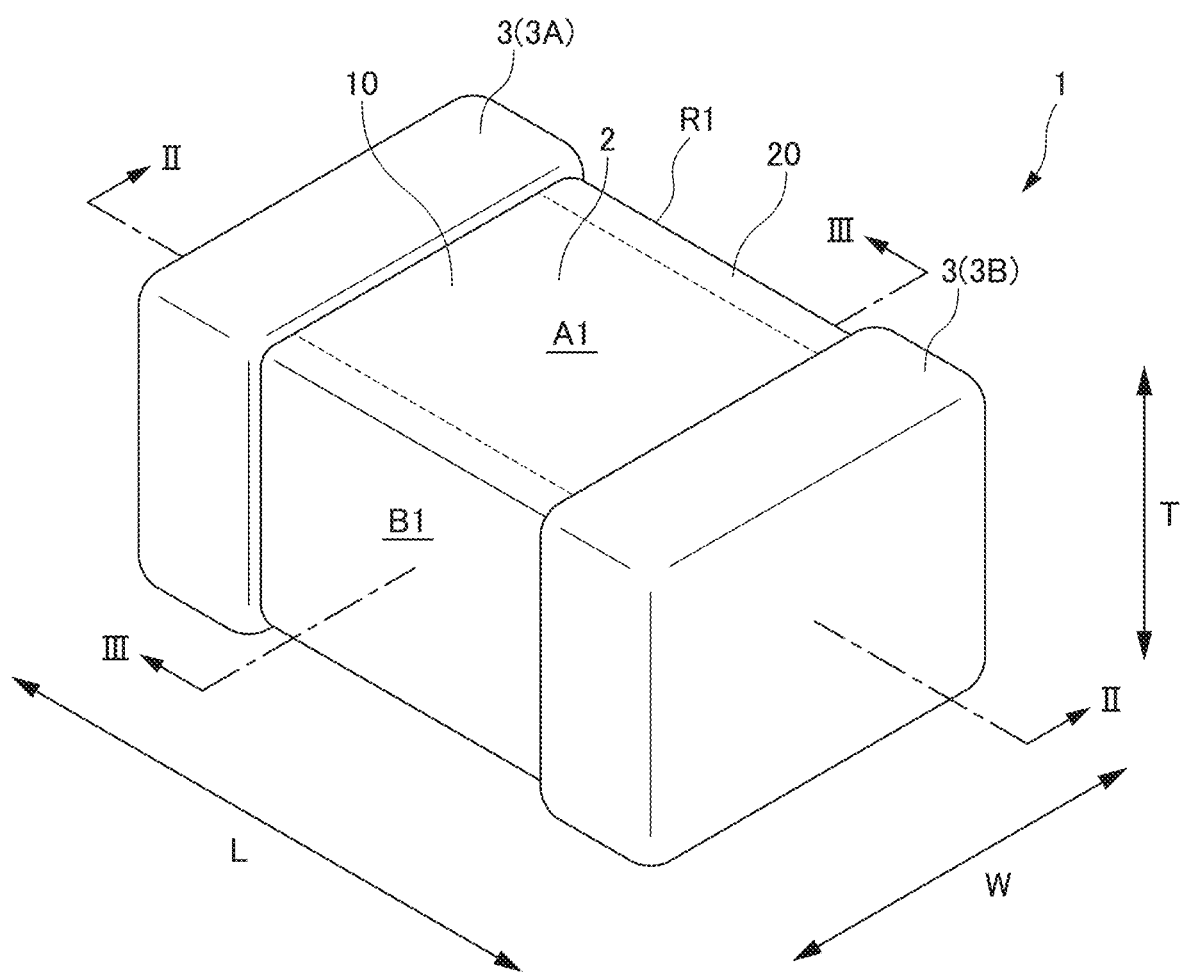
FIG. 1 is a schematic perspective view of a multilayer ceramic capacitor 1 according to a preferred embodiment of the present invention.
Figure 2:
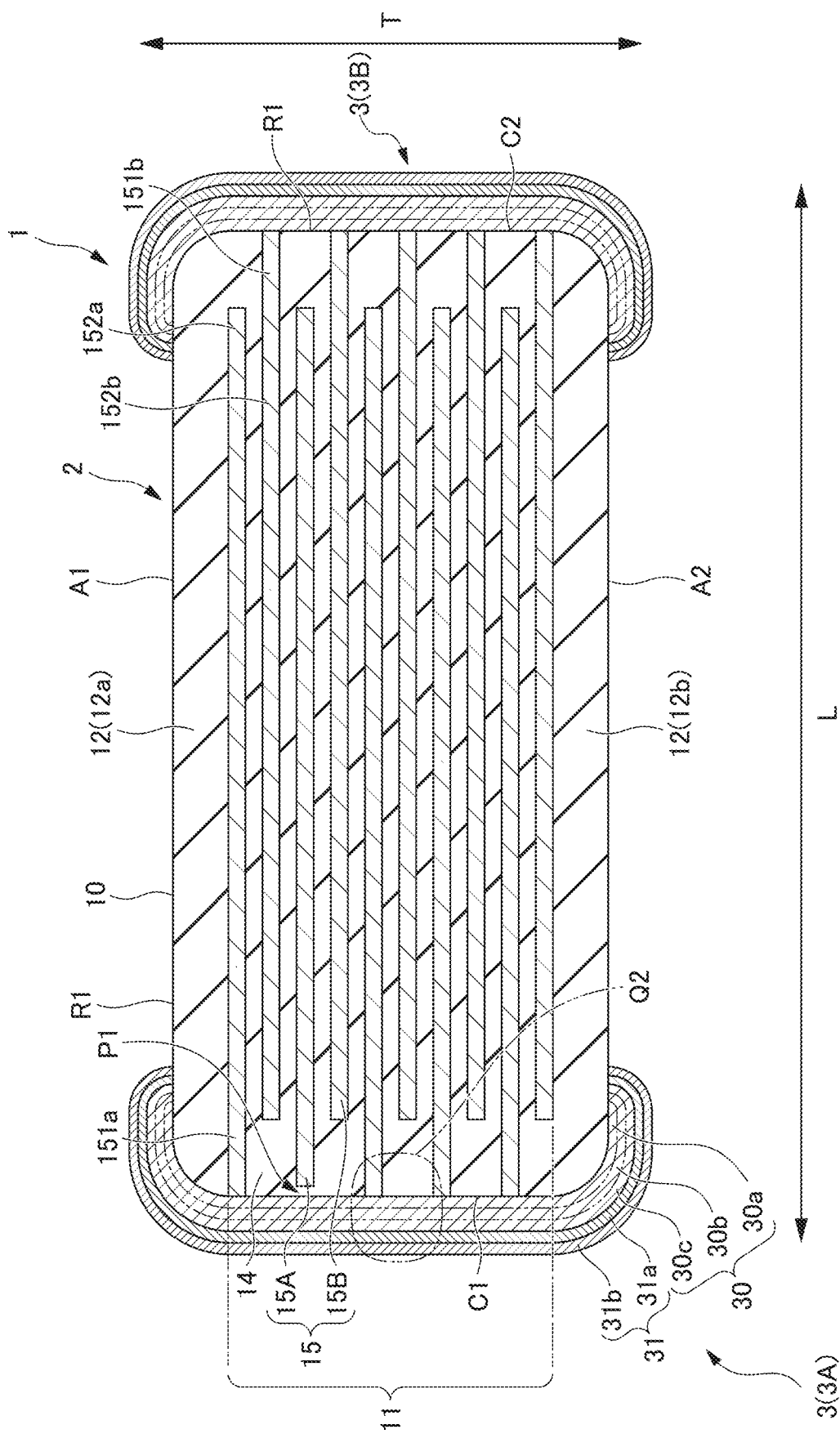
FIG. 2 is a cross-sectional view taken along the line II-II of the multilayer ceramic capacitor 1 shown in FIG. 1.
Figure 3:
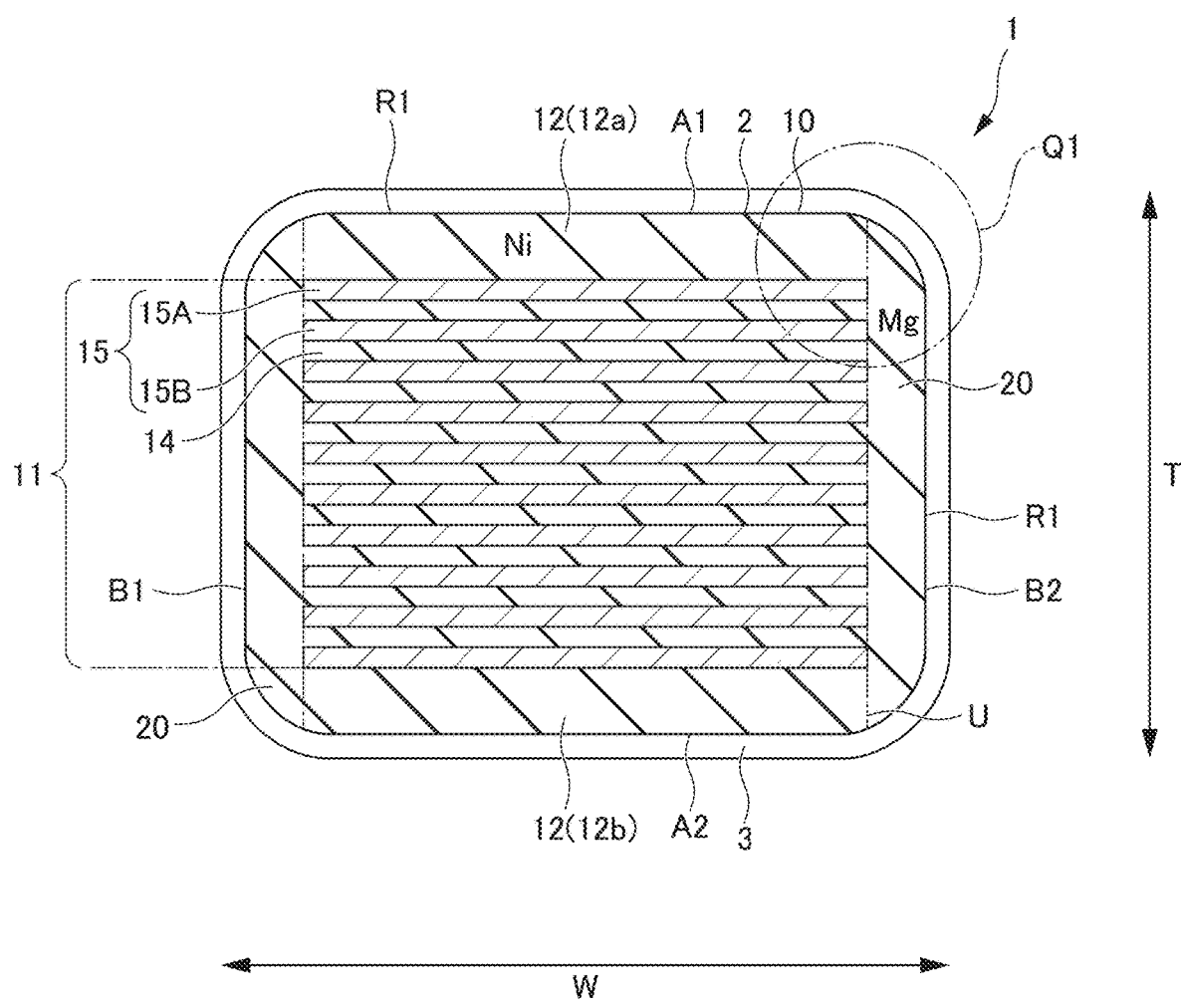
FIG. 3 is a cross-sectional view taken along the line III-III of the multilayer ceramic capacitor 1 in FIG. 1.

A multilayer ceramic capacitor 1 according to a preferred embodiment of the present invention will be described. FIG. 1 is a schematic perspective view of the multilayer ceramic capacitor 1 of the present preferred embodiment. FIG. 2 is a cross-sectional view taken along the line II-II of the multilayer ceramic capacitor 1 shown in FIG. 1. FIG. 3 is a cross-sectional view taken along the line III-III of the multilayer ceramic capacitor 1 in FIG. 1.

The multilayer ceramic capacitor 1 has a rectangular or substantially rectangular parallelepiped shape, and includes a multilayer body 2, and a pair of external electrodes 3 provided at both ends of the multilayer body 2. The multilayer body 2 includes an inner layer portion 11 including a plurality of sets of dielectric layers 14 and internal electrode layers 15.

In the following description, as terms representing the orientations of the multilayer ceramic capacitor 1, a direction in which the pair of external electrodes 3 are provided is defined as a length direction L. A direction in which the dielectric layers 14 and the internal electrode layers 15 are laminated (stacked) is defined as a lamination (stacking) direction T. A direction intersecting both the length direction L and the lamination direction T is defined as a width direction W. In the present preferred embodiment, the width direction is perpendicular or substantially perpendicular to both the length direction L and the lamination direction T.

Furthermore, a cross-section extending in the length direction L and the lamination direction T is defined as an LT cross-section, a cross-section extending in the length direction L and the width direction W is defined as an LW cross-section, and a cross-section extending in the width direction W and the lamination direction T is defined as a WT cross-section. FIG. 2 is an LT cross-sectional view at the middle portion in the width direction W of the multilayer ceramic capacitor 1. FIG. 3 is a WT cross-section at the middle portion in the length direction L of the multilayer ceramic capacitor 1.

Furthermore, among the six outer surfaces of the multilayer body 2, a pair of outer surfaces opposing each other in the lamination direction T is defined as a first main surface A1 and a second main surface A2, a pair of outer surfaces opposing each other in the width direction W is defined as a first side surface B1 and a second side surface B2, and a pair of outer surfaces opposing each other in the length direction L is defined as a first end surface C1 and a second end surface C2.

When it is not necessary to particularly distinguish the first main surface A1 and the second main surface A2 from each other, they are collectively referred to as the main surface A, when it is not necessary to particularly distinguish between the first side surface B1 and the second side surface B2, they are collectively referred to as a main surface B, and when it is not necessary to particularly distinguish between the first end surface C1 and the second end surface C2, they are collectively referred to as an end surface C.

The dimension of the multilayer ceramic capacitor 1 is not particularly limited. However, for example, it is preferable that the dimension in the length direction L is about 0.2 mm or more and about 1.2 mm or less; the dimension in the width direction W is about 0.1 mm or more and about 0.7 mm or less, and the dimension in the lamination direction T is about 0.1 mm or more and about 0.7 mm or less.

Multilayer Body 2

The multilayer body 2 includes a laminate chip 10, and side gap portions 20 provided on both sides in the width direction W of the laminate chip 10. In the multilayer body 2, ridge portions R1 of the two surfaces of the main surface A, the side surface B, and the end surface C are chamfered and rounded.

Laminate Chip 10

The laminate chip 10 includes the inner layer portion 11, an upper outer layer portion 12a in the vicinity of the first main surface A1 of the inner layer portion 11, and a lower outer layer portion 12b in the vicinity of the second main surface A2 of the inner layer portion 11. When it is not necessary to particularly distinguish between the upper outer layer portion 12a and the lower outer layer portion 12b, they are collectively referred to as an outer layer portion 12.

Inner Layer Portion 11

The inner layer portion 11 includes the plurality of sets of dielectric layers 14 and internal electrode layers 15 which are alternately laminated along the lamination direction T.

Dielectric Layer 14

The dielectric layers 14 each preferably have a thickness of, for example, about 0.4 μm or more and about 1.0 μm or less, and more preferably, about 0.4 μm or more and about 0.6 μm or less.

The dielectric layers 14 are each made of a ceramic material. As the ceramic material, for example, a dielectric ceramic including $BaTiO_3$ as a main component is used. The number of dielectric layers 14 of the laminate chip 10 in addition to the upper outer layer portion 12a and the lower outer layer portion 12b is preferably, for example, 15 or more and 700 or less.

In the present preferred embodiment, the dielectric layers 14 do not include Ni (nickel), or alternatively, the Ni content in the dielectric layers 14 is less than the Ni content in the outer layer portion 12. Thus, it is possible to increase the size of the particles of the dielectrics in the dielectric layers 14, such that it is possible to increase the capacitance.

Internal Electrode Layer 15

The internal electrode layer 15 preferably has a thickness of, for example, about 0.2 μm or more and about 0.8 μm or less. The number of the internal electrode layers 15 is preferably, for example, 15 or more and 700 or less.

The average thickness of each of the plurality of internal electrode layers 15 and the plurality of dielectric layers 14 is measured as follows. First, a cross section perpendicular or substantially perpendicular to the length direction L of the multilayer body 2 exposed by polishing is observed by a scanning electron microscope. Next, the thicknesses of the total of five lines including a center line along the lamination direction T passing through the center of the cross-section of the multilayer body 2, and two lines respectively drawn on both sides at equal or substantially equal intervals from the center line are measured. The average of these five measurements is calculated. To obtain a more accurate average thickness, the above five measurements are obtained at each of the upper portion, the middle portion, and the lower portion in the lamination direction T are obtained, and the average value of these measurements is used as the average thickness.

The internal electrode layer 15 includes a plurality of first internal electrode layers 15A and a plurality of second internal electrode layers 15B. The first internal electrode layers 15A and the second internal electrode layers 15B are alternately provided. When it is not necessary to particularly distinguish between the first internal electrode layer 15A and the second internal electrode layer 15B, they will be collectively referred to as an internal electrode layer 15.

The first internal electrode layers 15A each include a first opposing portion 152a facing the second internal electrode layer 15B, and a first lead-out portion 151a extending from the first opposing portion 152a toward the first end surface C1. The end portion of the first lead-out portion 151a is exposed to the first end surface C1, and electrically connected to the first external electrode 3A to be described later.

The second internal electrode layers 15B each include a second opposing portion 152b facing the first internal electrode layer 15A, and a second lead-out portion 151b extending from the second opposing portion 152b toward the second end surface C2. The end portion of the second lead-out portion 151b is electrically connected to the second external electrode 3B to be described later.

Furthermore, a charge is accumulated in the first opposing portion 152a of the first internal electrode layer 15A and the second opposing portion 152b of the second internal electrode layer 15B, and the characteristics of the capacitor are provided.

Figure 4:
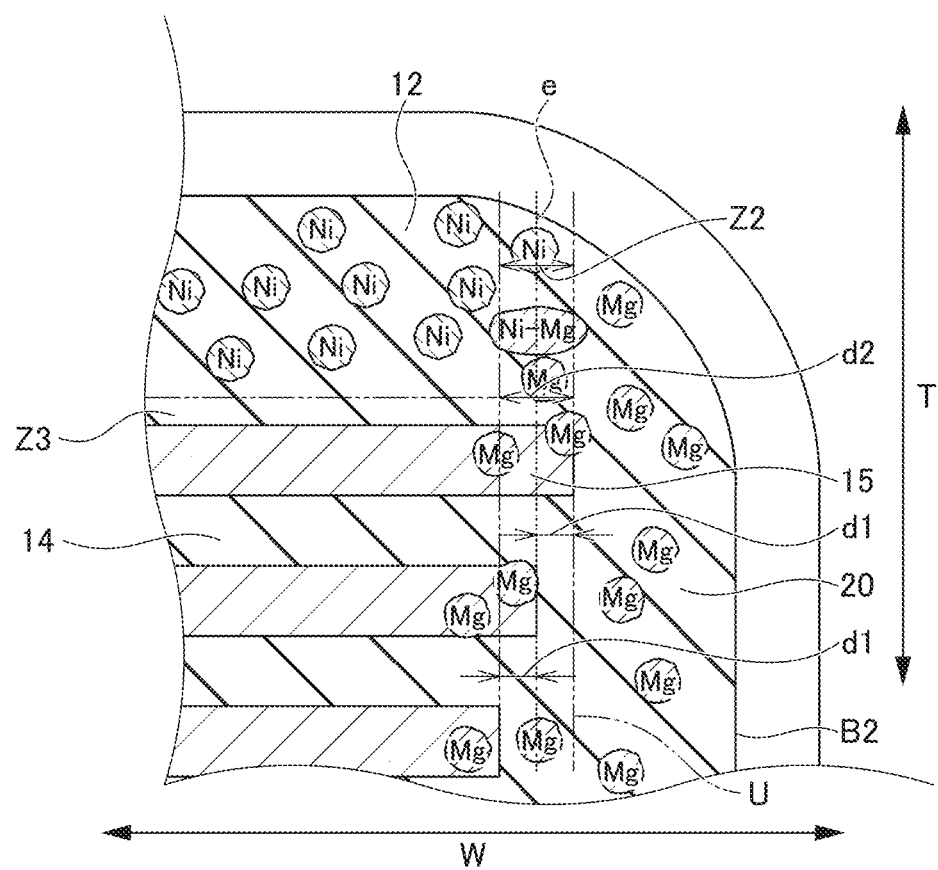
FIG. 4 is a partially enlarged view of FIG. 3.

FIG. 4 is an enlarged view of the portion Q1 of FIG. 3. As shown in FIG. 4, in the WT cross-section at the middle portion in the length direction L, the positional deviation d1 between the end portions of the adjacent internal electrode layers 15 in the width direction W is, for example, about 5 μm or less.

Furthermore, the positional deviation d2 between the end portion which is in the vicinity of the side surface B and located outermost in the width direction W and the end portion which is located innermost in the width direction W among all of the internal electrode layers 15 is, for example, about 10 μm or less.

That is, the end portions in the width direction W of the laminated internal electrode layers 15 are located at the same or substantially the same position in the width direction W. In other words, the positions of the end portions are aligned or substantially aligned in the lamination direction T.

In the present preferred embodiment, the internal electrode layers 15 are, for example, made mainly of Ni (nickel) including Sn (tin). However, the present invention is not limited thereto, and the internal electrode layers 15 may be made of, for example, a metallic material such as Cu, Ag, Pd, a Ag—Pd, and Au.

Furthermore, Mg (magnesium) included in the side gap portions 20 is segregated at the side gap portions 20 on both side surfaces of the internal electrode layers 15.

Sn-Layer 16 Extending from Internal Electrode Layer 15

Figure 5:
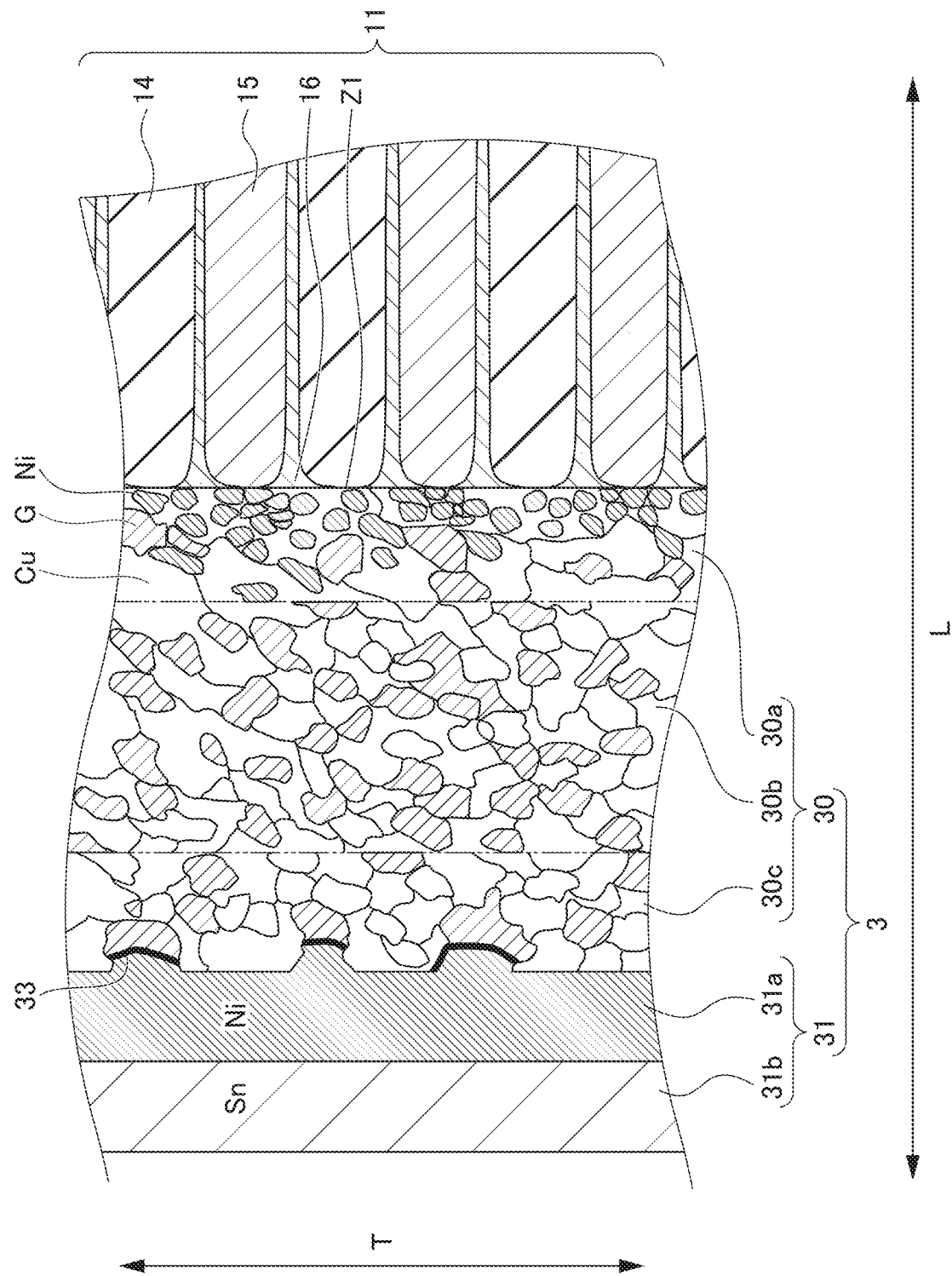
FIG. 5 is an enlarged view of the circled portion Q2 of FIG. 2.

FIG. 5 is an enlarged view of the circled portion Q2 of FIG. 2.

The Sn-layer 16 is provided on the surfaces of the internal electrode layers 15. The Sn-layer 16 is formed by migrating from the inside to the surface during firing. The Sn-layer 16 extends from the surfaces of the internal electrode layers 15 to a boundary region Z1 between the external electrode 3, and the dielectric layers 14 and the internal electrode layers 15 adjacent to one another in the lamination direction T. Furthermore, the Sn-layer 16 also covers the boundary surfaces of the internal electrode layers 15 with the external electrode 3.

It should be noted that it is not necessary for the Sn-layer 16 to cover the entire internal electrode layers 15, and the Sn-layer 16 can only cover a portion of the internal electrode layers 15.

Effect of Sn-layer 16

In the multilayer ceramic capacitor 1 of the present preferred embodiment, since the Sn-layer 16 extends to the boundary region Z1 between the dielectric layers 14 and the external electrode 3, for example, it is possible to reduce or prevent moisture through the boundary surface between the external electrode 3 and the multilayer body 2 from flowing in the interior of the inner layer portion 11, which provides high humidity resistance.

In the present preferred embodiment, the Sn-layer 16 extending from one of the internal electrode layers 15 is not coupled to the Sn-layer 16 extending from another internal electrode layer 15 adjacent to the one internal electrode layer 15, and there is also a portion where the Sn-layer 16 is not provided in the boundary region Z1 between the dielectric layer 14 and the external electrode 3. However, it is sufficiently effective to improve the humidity resistance of the multilayer ceramic capacitor 1 even in such a case.

Outer Layer Portion 12

The thickness of the outer layer portion 12 is preferably about 9.5 μm or more and about 30 μm or less, and more preferably about 9.5 μm to about 20 μm, for example, for both the upper outer layer portion 12a and the lower outer layer portion 12b.

Ni in Outer Layer Portion 12

Both the upper outer layer portion 12a and the lower outer layer portion 12b of the outer layer portion 12 are made of a dielectric ceramic material including $BaTiO_3$ as a main component, similar to the dielectric layer 14 of the inner layer portion 11, for example. However, the upper outer layer portion 12a and the lower outer layer portion 12b differ from the dielectric layer 14 of the inner layer portion 11 in that the former includes Ni, or the content of Ni is higher in the former than in the latter.

As schematically shown in FIG. 4, Ni is not provided in a region Z3 in a vicinity of the internal electrode layer 15 in the outer layer portion 12, since Ni is absorbed by the internal electrode layer 15. That is, Ni is distributed unevenly rather than entirely in the outer layer portion 12. Furthermore, the density of Ni is highest in the middle portion of the outer layer portion 12 in the lamination direction T.

Advantageous Effects

Since the multilayer ceramic capacitor 1 of the present preferred embodiment includes Ni in the outer layer portion 12, particles of the dielectric ceramic after firing are densified.

Furthermore, since the pores provided in the dielectric ceramic in the outer layer portion 12 are filled with Ni, humidity resistance is increased in the multilayer ceramic capacitor 1.

Furthermore, Ni in the outer layer portion 12 is diffused into the Cu-layer of the external electrode 3, such that the adhesion with the external electrode 3 is improved.

Although Mg preferably is not included in the outer layer portion 12 in the present preferred embodiment, Mg may be included in the outer layer portion 12.

Side Gap Portion 20

The side gap portions 20 include side gap portions 20 which are respectively provided in the vicinity of the first side surface B1 of the laminate chip 10 and the second side surface B2 of the laminate chip 10. When it is not necessary to particularly distinguish between the first side gap portion 20a and the second side gap portion 20b, they will be collectively referred to as a side gap portion 20.

Component of Side Gap Portion 20

The side gap portions 20 each cover, along the end portions, the end portions in the width direction W of the internal electrode layers 15 exposed at the both side surfaces of the laminate chip 10. There is an interface U shown in FIGS. 3 and 4 between the laminate chip 10 and the side gap portion 20.

The side gap portions 20 are made of, for example, a dielectric ceramic material including $BaTiO_3$ as a main component, similarly to the dielectric layers 14, but further include Mg as a sintering aid. The content of Mg is, for example, about 0.2 mol % or more and about 2.8 mol % or less with respect to 100 moles of Ti at the middle portion in the length direction L of the side gap portion 20. When Mg is about 2.8 mol % or less, since the grain growth of the dielectric is not reduced or prevented in the dielectric layer 14 in the vicinity of the outermost layer of the internal electrode layers 15, a capacitance decrease is less likely to occur.

Furthermore, Mg of the side gap portion 20 and Ni of the outer layer portion 12 are segregated in a boundary region Z2 between the side gap portion 20 and the outer layer portion 12 during firing. A portion of the segregated Ni and a portion of the segregated Mg provides a Ni—Mg oxide.

That is, Ni—Mg oxide is segregated in the boundary region Z2. A portion of Ni segregated in the boundary region Z2 is present in the form of Ni in the boundary region Z2. A portion of Mg segregated in the boundary region Z2 is present in the form of Mg in the boundary region Z2. Therefore, Ni—Mg oxide, Ni, and Mg are segregated in the boundary region Z2.

Ni is not included in the dielectric layer 14. Therefore, the segregation of Ni and Ni—Mg oxide in the boundary region between the dielectric layer 14 and the side gap portion 20 is smaller than the segregation of Ni and Ni—Mg oxide in the boundary region Z2.

Since the dielectric layers 14 do not include Ni, the grain growth of the particles of the dielectric layers 14 is not reduced or prevented. Therefore, the particles of the dielectric layers 14 become large, such that it is possible to increase the capacitance of the multilayer ceramic capacitor 1.

A Ni—Mg alloy, which is an alloy of Mg included in the side gap portion 20 and Ni included in the outer layer portion 12, is segregated in the boundary region Z2 between the side gap portion 20 and the outer layer portion 12. The boundary region Z2 tends to become the penetration path of moisture. A portion of the pores in the boundary region Z2 is filled with Ni—Mg oxide. A portion of the pores present in the boundary region Z2 is filled with Ni or Mg. Thus, the multilayer ceramic capacitor 1 of the present preferred embodiment has high humidity resistance.

Boundary Region Z2

Regarding the end portions of the internal electrode layers 15 as described above, the positional deviation d1 between the adjacent internal electrode layers 15 on the WT cross-section including the width direction W and the lamination direction T at the middle portion in the length direction L shown in FIG. 4, is, for example, about 5 μm less. Furthermore, the positional deviation d2 among the end portion which is located outermost in the width direction W of the internal electrode layer 15, the end portion which is located innermost in the width direction W of the internal electrode layer 15, and all of the internal electrode layers 15, is, for example, about 10 μm or less.

The boundary region Z2 between the side gap portion 20 and the outer layer portion 12 is a substantially band-shaped region of about 3 μm in the width direction W around the extended line e extending in the lamination direction T on the middle in the width direction W between the end portion of the internal electrode layer 15 located outermost in the width direction W, and the end portion of the internal electrode layer 15 located innermost in the width direction W.

The segregation of Ni—Mg oxide, the segregation of Ni, and the segregation of Mg can be observed by WDX (wavelength-dispersive X-ray spectrometry).

External Electrode 3

The external electrodes 3 each include a first external electrode 3A provided on the first end surface C1 of the multilayer body 2, and a second external electrode 3B provided on the second end surface C2 of the multilayer body 2. When it is not necessary to particularly distinguish between the first external electrode 3A and the second external electrode 3B, they will be collectively referred to as an external electrode 3. The external electrode 3 covers not only the end surface C, but also covers portions of the main surface A and the side surface B which are in the vicinity of the end surface C.

As described above, the end portion of the first lead-out portion 151a of the first internal electrode layer 15A is exposed at the first end surface C1, and electrically connected to the first external electrode layer 3A. Furthermore, the end portion of the second lead-out portion 151b of the second internal electrode layer 15B is exposed at the second end surface C2, and is electrically connected to the second external electrode 3B. Thus, a plurality of capacitor elements are electrically connected in parallel between the first external electrode 3A and the second external electrode 3B.

External Electrode 3

Connection Ratio Between Internal Electrode Layer 15 and External Electrode 3

Figure 6:
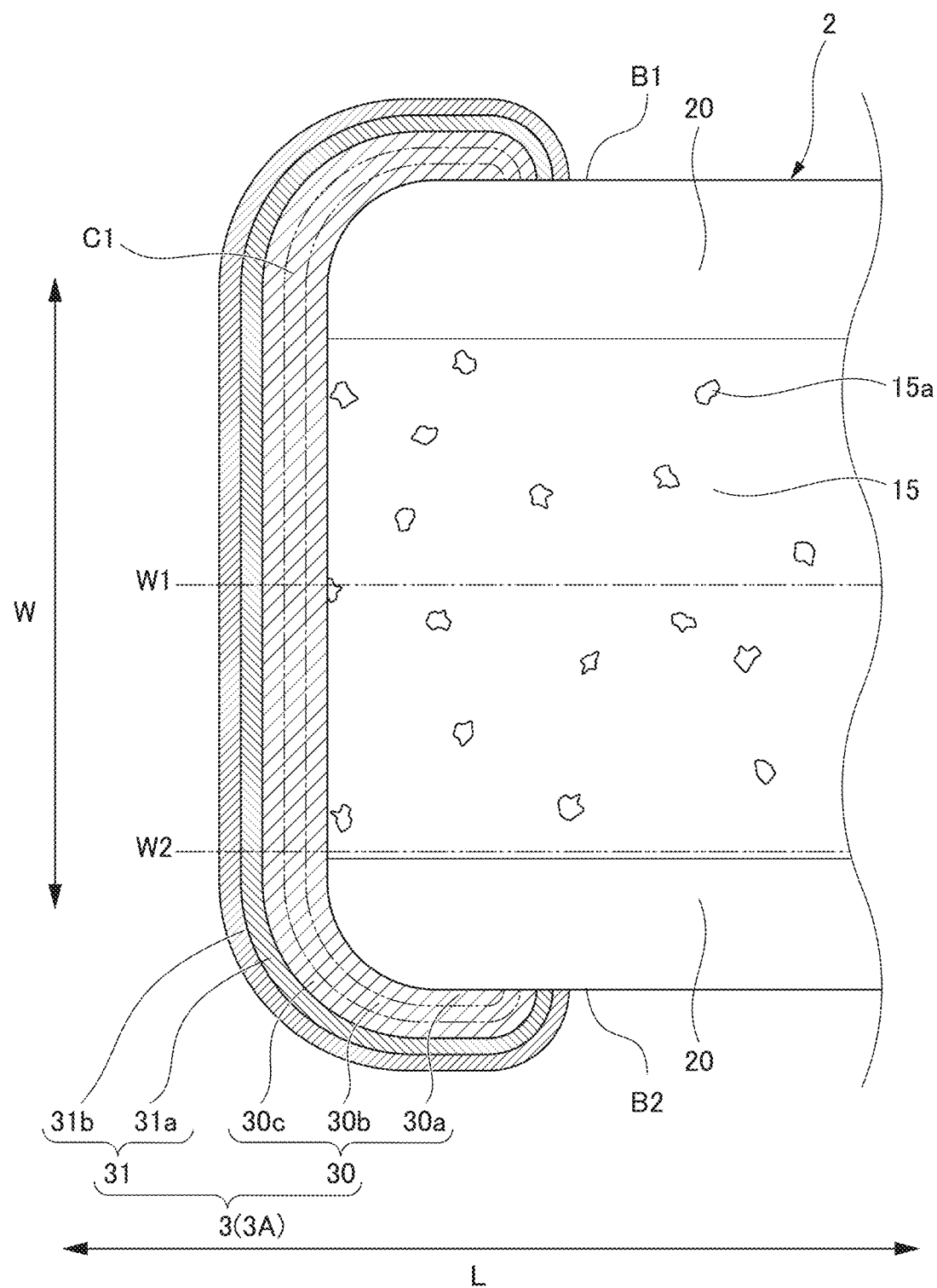
FIG. 6 is a LW cross-sectional view through internal electrode layers 15 of the multilayer ceramic capacitor 1.

FIG. 6 is an LW cross-sectional view through the internal electrode layers 15 of the multilayer ceramic capacitor 1. FIG. 3 provides a WT cross-section at a position W1 passing through the middle portion in the width direction W of FIG. 6. A position W2 in FIG. 6 is a position passing through the end portion of the internal electrode layer 15 in the width direction W.

Since the internal electrode layers 15 are each thin, a plurality of pores 15a are actually extending through the lamination direction T. Therefore, when viewed in the LT cross-section as in FIG. 2, not all of the internal electrode layers 15 are connected to the external electrode 3. As shown by position P1 in FIG. 2, the internal electrode layer 15 may be separated from the external electrode 3. However, although the internal electrode layer 15 and the external electrode 3 are not connected to each other at the position P1, the internal electrode layer 15 and the external electrode 3 are connected at a position shifted in the width direction W from the position P1.

Here, the number of all of the internal electrode layers 15 extending to one of the external electrodes 3 in the LT cross-section shown in FIG. 2 at a certain location in the width direction W in FIG. 6 is defined as N0, and the number of the internal electrode layers 15 connected to the one of the external electrodes 3 among them is defined as N. Then, the connection ratio at the certain location is defined as N/N0.

For example, when the number of all of the internal electrode layers 15 extending to one of the external electrodes 3 in the LT cross-section shown in FIG. 2 at the position W1 passing through the middle portion in the width direction W in FIG. 6 is defined as N0, and the number of the internal electrode layers 15 connected to the one of the external electrodes 3 among them is N1, the connection ratio at the position W1 is defined as N1/N0.

Furthermore, similarly to the above, when the number of all of the internal electrode layers 15 extending to one of the external electrodes 3 in the LT cross-section shown in FIG. 2 at the position W2 passing through the end portions in the width direction W in FIG. 6 is defined as N0, and the number of the internal electrode layers 15 connected to the one of the external electrodes 3 among them is defined as N2, the connection ratio at the position W2 is defined as N2/N0.

In common multilayer ceramic capacitors that differ from the present preferred embodiment, for example, the connection ratio N1/N0 in the LT cross-section at the position W1 passing through the middle portion in the width direction W, and the connection ratio N2/N0 in the LT cross-section at the position W2 passing through the end portions in the width direction W are greater than about 90% when expressed as a percentage. Furthermore, for example, the difference between the connection ratio N1/N0 at the position W1 passing through the middle portion in the width direction W, and the connection ratio N2/N0 at the position W2 passing through the end portion in the width direction W is smaller than about 10%.

When the connection ratio is smaller than about 90%, and the difference in the connection ratio differs greatly by the position, the connectivity between the internal electrode layer 15 and the external electrode 3 is deteriorated, the flow of electricity is reduced or prevented or becomes unstable, such that the equivalent series resistance (ESR) of the multilayer ceramic capacitor may increase.

However, in the multilayer ceramic capacitor 1 of the present preferred embodiment, the connection ratio N1/N0 at the position W1 passing through the middle portion in the width direction W, and the connection ratio N2/N0 at the position W2 passing through the end portion in the width direction W are about 90% or more when expressed as a percentage. Furthermore, the difference between the connection ratio N1/N0 at the position W1 passing through the middle portion in the width direction W, and the connection ratio N2/N0 at the position W2 passing through the end portion in the width direction W is about 10% or less.

Therefore, according to the multilayer ceramic capacitor 1 of the present preferred embodiment, the contact area between the internal electrode layer 15 and the external electrode 3 is sufficiently secured, there is no variation in the connection ratio, a good connection ratio is ensured, electricity flows well, and the equivalent series resistance (ESR) of the multilayer ceramic capacitor can also be reduced.

Detection Method

The connection ratio between the external electrode 3 and the internal electrode layer 15 is detected as follows.

Connection Ratio at Position W1

Polishing starts at the LT side surface of the multilayer ceramic capacitor 1, and the internal electrode layers 15 begin to be exposed, such that the resultant LT cross-section polished about 5 μm is exposed.

Then, the number of the internal electrode layers 15 extending to one of the external electrodes 3 in the LT cross-section and connecting with the one of the external electrodes 3 is defined as N1.

The total number of the internal electrode layers 15 connected to the external electrode 3 provided on the same side is defined as N0.

With N1 and N0 above, the connection ratio N1/N0 at the position W1 is obtained.

Connection Ratio at Position W2

Polishing starts at the LT side surface of the multilayer ceramic capacitor 1, and continues up to the middle portion of the internal electrode layers 15 in the width direction, such that the resultant LT cross-section is exposed.

Then, the number of the internal electrode layers 15 extending to one of the external electrodes 3 in the LW cross-section and connecting with the one of the external electrodes 3 is defined as N2.

The total number of the internal electrode layers 15 connected to the external electrode 3 provided on the same side is defined as N0.

With N2 and N0 above, the connection ratio N2/N0 at the position W1 is obtained.

In a case in which the number of the internal electrode layers 15 is large, it is acceptable to check about 20 pieces of the internal electrode layers 15 in the region of the outermost layer and about 40 pieces of the internal electrode layers 15 at the middle portion in the lamination direction T to obtain the number of the internal electrode layers connected to the external electrode 3 and calculate the average value.

In the multilayer ceramic capacitor 1 of the present preferred embodiment, a result of actual measurement showed that the connection ratios at the position W1 and the position W2 were about 90% or more.

The reason why it is possible to obtain high connection ratios in this way will be described in the manufacturing method described later.

Structure of External Electrode 3

The external electrode 3 includes a base electrode layer 30 and a plated layer 31 in order from the multilayer body 2.

As shown in FIGS. 2 and 6, the base electrode layer 30 is divided into a first region 30a of, for example, about 0.1 μm to about 5 μm, a second region 30b, and a third region 30c of, for example, about 0.1 μm to about 5 μm in order from the multilayer body 2. The thickness of the second region 30b is not limited to about 0.1 μm to about 5 μm. The thickness of the second region 30b corresponds to the remaining thickness obtained by eliminating the first region 30a and the third region 30c from the external electrode 3. The plated layer 31 includes a Ni plated layer 31a and a Sn plated layer 31b in order from the base electrode layer 30. The external electrode 3 including these layers covers not only the end surface C, but also covers portions of the main surface A and the side surface B in the vicinity of the end surface C.

Furthermore, the first region 30a, the second region 30b, and the third region 30c may be divided according to the ratio of glass G. For example, in the LT cross-section, when the area ratio of glass to Cu in the entire base electrode layer 30 (area of glass/area of Cu) is defined as P, the first region 30a may be defined as a region of about 0.1P or less, the second region 30b may be defined as a region of about 1.2P or more, and the third region 30c may be defined as a region lower than about 1.0P. It should be noted that a second region may or may not be included. The second region can belong to the first region or the third region when the second region satisfies either one of the defined thickness or P of them.

Material of External Electrode 3

The first region 30a, the second region 30b, and the third region 30c of the base electrode layer 30 are formed by firing a Cu paste in which glass G including Ba (barium) for densification is mixed, and thus, are electrodes by post-fire which are separately fired after the firing of the multilayer body 2.

First Region 30a

The thickness of the first region 30a in the length direction L is, for example, about 0.1 μm or more and about 5 μm or less.

As schematically shown in FIG. 5, the first region 30a includes Ni, which is a metal included in the internal electrode layers 15, in a larger amount than the second region 30b and the third region 30c. When detected by WDX, the intensity ratio of Ni to Cu is preferably about 20% or more, for example.

Ni is included in a higher density, in particular, on a side of the first region 30a in the vicinity of the inner layer portion 11, than in the other regions such as a side of the first region 30a in the vicinity of the second region 30b, the second region 30b, and the third region 30c. A Ni-rich layer is provided on the side of the first region 30a in the vicinity of the inner layer portion 11. Furthermore, the density of Ni near the internal electrode layers 15 in the side of the first region 30a in the vicinity of the inner layer portion 11 is higher than the density of Ni adjacent to the dielectric layers 14 in the side of the first region 30a in the vicinity of the inner layer portion 11. Furthermore, Ni makes a solid solution with Cu in the first region 30a, and is alloyed.

As described above, the first region 30a includes a Ni component more than the second region 30b and the third region 30c. Therefore, the internal electrode layers 15 and the base electrode layer 30 have a better connection ratio.
Particle Size of Cu being Large in Side in the Vicinity of Multilayer Body 2

Furthermore, the particle size of Cu in the first region 30a is larger than that in the second region 30b and the third region 30c. In addition, the thickness decreases as approaching the second region 30b and the third region 30c.

The particle size of Cu is specified based on the area in the LT cross-section shown in FIG. 5.
Second Region 30b The second region 30b corresponds to a region other than the first region 30a and the third region 30c. The second region 30b is preferably thicker than the total value of the thicknesses of the first region 30a and the third region 30c, and is, for example, about 10 µm or more and about 40 µm or less.

The second region 30b includes more glass G than the first region 30a and the third region 30c. When the area ratio of glass to Cu (area of glass/area of Cu) in the entire base electrode layer 30 in the LT cross-section is P, the glass G is, for example, equal to or larger than about 1.2P. The ratio of the glass G is obtained by measuring the area of Si by WDX, and calculating the area of Si with respect to the total area.
Third Region 30c The third region 30c includes more Cu than the first region 30a and the second region 30b. The content of the glass is, for example, less than about 1.0P in the LT cross-section shown in FIG. 5.

The third region 30c includes more Cu than the second region 30b and the third region 30c. Therefore, the connection ratio when mounting the multilayer ceramic capacitor 1 on a board is favorable.

Furthermore, it is possible to determine the adhesiveness of the Ni plated layer 31a by counting portions where plating is not provided by visually checking 100 locations on the surface of the plated layer 31.

The third region 30c contains Cu in the greatest amount. Therefore, the Ni plated layer 31a on the outer side is easily adhered thereto. Furthermore, the plated layer 31 overall is hardly peeled off therefrom. In the present preferred embodiment, there was no portion without plating.

In the multilayer ceramic capacitor 1 of the present preferred embodiment, since the ratio of the glass G in the second region 30b is, for example, about 1.2P or more, the multilayer ceramic capacitor 1 has a high sealability property and high moisture resistance. Regarding humidity resistance of the multilayer ceramic capacitor 1, it was determined that the humidity resistance was low when a voltage of about 6.3V was applied and the resistance was below about 100 MΩ under an environment of temperature about 85° C. and humidity about 85%. The threshold of about 100 MΩ is for the case of a capacitance of about 1 µF.

Unlike the present preferred embodiment, among 100 pieces of the multilayer ceramic capacitors 1 for comparison having the ratio of glass G smaller than about 1.2P in the second region 30b, the resistance was below about 100 MΩ in eleven pieces of the multilayer ceramic capacitors. Among 100 pieces of the multilayer ceramic capacitors 1 in the present preferred embodiment having the ratio of glass G of equal to or larger than about 1.2P in the second region 30b, there was no multilayer ceramic capacitors in which the resistance is below about 100 MΩ.

As described above, the multilayer ceramic capacitor 1 of the present preferred embodiment has favorable moisture resistance because the ratio of the glasses G in the second regions 30b, for example, about 1.2P or more.
Protective Layer 33

In the third region 30c in the multilayer ceramic capacitor 1 of the present preferred embodiment, protective layers 33 including S (sulfur) and Ba (barium) are each provided on a surface of the glass G facing the Ni plated layer 31a. The protective layers 33 cover about 50% or more of the portions containing the glass G on the surface of the third region 30c, that is, the surface of the base electrode layer 30, and preferably cover about 70% or more thereof. The thicknesses of the protective layers 33 are, for example, each about 10 nm or more and about 1 µm or less.
Confirmation Method of Protective Layer 33

The protective layers 33 can be confirmed by imaging a region including glass G, the third region 30c, and the Ni plated layer 31a in the region within the region in the external electrode 3 in the LT cross-section in the middle portion in the width direction by TEM (Transmission Electron Microscope)-EDX (Energy Dispersive X-ray Spectroscopy).
Thickness of Protective Layer 33

The thickness of the protective layer 33 is obtained by measuring the thicknesses of S and Ba from the glass G toward the interior of the Ni plated layer 31a based on the observed S and Ba images. When the surface of the glass G is a curved surface, the thickness in the normal direction is used. If the thickness varies depending on locations, average values of the regions divided into three equal portions in the lamination direction in the LT cross section may be used.
Coverage of Protective Layer 33

The coverage of the protective layer 33 can be obtained by dividing the length of the protective layer 33 by the length of the surface of the base electrode layer 30 including the surface of the glass G, measured on the LT cross-section.
Plated Layer 31

The plated layer 31 includes, for example, the Ni plated layer 31a and the Sn plated layer 31b in order from the base electrode layer 30.
Method of Manufacturing Multilayer Ceramic Capacitor 1

Figure 7:
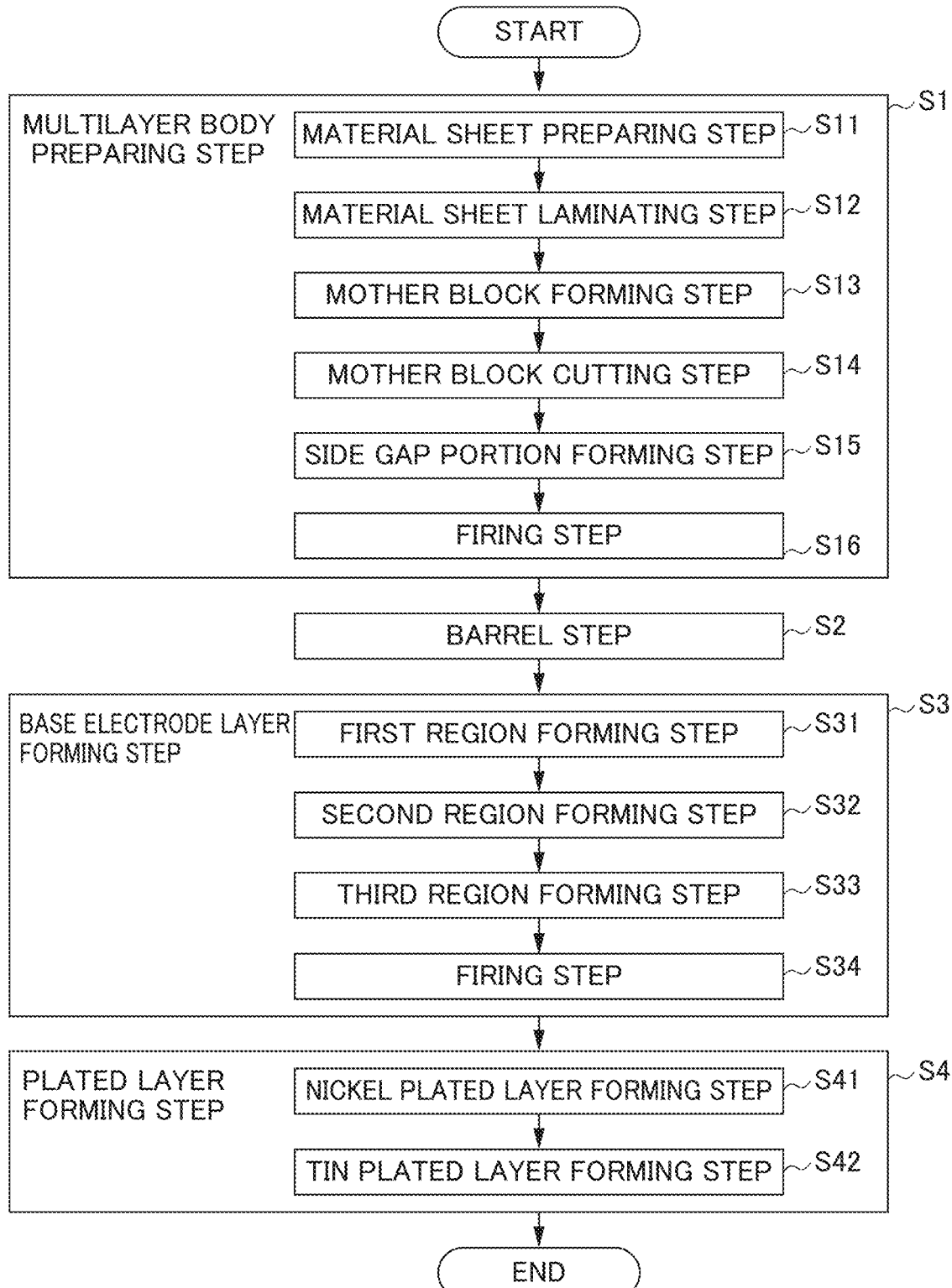
FIG. 7 is a flowchart showing a method of manufacturing the multilayer ceramic capacitor 1.

FIG. 7 provides a flowchart showing a method of manufacturing the multilayer ceramic capacitor 1.

The method of manufacturing the multilayer ceramic capacitor 1 includes a multilayer body preparing step S1 of preparing the multilayer body 2, a barrel step S2, a base electrode layer forming step S3, and a plated layer forming step S4.
Multilayer Body Preparing Step S1

The multilayer body preparing step S1 includes a material sheet preparing step S11, a material sheet laminating step S12, a mother block forming step S13, a mother block cutting step S14, a side gap portion forming step S15, and the firing step S16. FIG. 8 is a diagram for explaining the multilayer body preparing step S1 and the barrel step S2.
Material Sheet Preparing Step S11

A ceramic slurry including a ceramic powder including, for example, $BaTiO_3$ as a main component, a binder, and a solvent is prepared. In the present preferred embodiment, the ceramic slurry does not include Ni, or the Ni content therein is smaller than that in the outer layer portions 12.

The ceramic slurry is molded into a sheet shape or substantially a sheet shape using, for example, a die coater, a gravure coater, a micro gravure coater, etc. on a carrier film, such that an inner layer ceramic green sheet 101 is manufactured. Furthermore, an upper outer layer portion ceramic green sheet 112 defining and functioning as the upper outer layer portion 12a, and a lower outer layer portion ceramic green sheet 113 defining and functioning as the lower outer layer portion 12b are also manufactured in the same or substantially the same manner.

The upper outer layer portion ceramic green sheet 112 and the lower outer layer portion ceramic green sheet 113 are manufactured by a ceramic slurry including, for example, a ceramic powder including $BaTiO_3$ as a main component, a binder, and a solvent, similarly to the inner layer ceramic green sheet 101. However, unlike the inner layer ceramic green sheet 101, the upper outer layer portion ceramic green sheet 112 and the lower outer layer portion ceramic green sheet 113 include Ni, or have a higher Ni content than the inner layer ceramic green sheet 101.

Subsequently, the conductive paste 102 including Ni, glass (Si oxide), and Sn is printed by, for example, screen-printing, ink jet printing, gravure printing, or the like, so as to have a strip-shaped pattern or substantially a strip-shaped pattern, on the inner layer ceramic green sheet 101.

Thus, the material sheet 103 is prepared by printing the conductive paste 102 defining and functioning as the internal electrode layer 15 on the surface of the inner layer ceramic green sheet 101 defining and functioning as the dielectric layer 14.

Material Sheet Laminating Step S12

Next, in the material sheet laminating step S12, a plurality of material sheets 103 are laminated.

Specifically, the plurality of material sheets 103 are stacked such that the strip-shaped conductive pastes 102 are directed in the same or substantially the same direction and shifted by half pitch in the width direction between the adjacent material sheets 103.

Furthermore, the upper outer layer portion ceramic green sheet 112 defining and functioning as the upper outer layer portion 12a is stacked on one side of the plurality of laminated material sheets 103, and the lower outer layer portion ceramic green sheet 113 defining and functioning as the lower outer layer portion 12b is stacked on the other side thereof.

Mother Block Forming Step S13

Subsequently, in the mother block forming step S13, the upper outer layer portion ceramic green sheet 112, the plurality of stacked material sheets 103, and the lower outer layer portion ceramic green sheet 113 are subjected to thermocompression bonding. As a result, the mother block 110 is formed.

Mother Block Cutting Step S14

Then, in the mother block cutting step S14, the mother block 110 is cut along a cutting line X and a cutting line Y intersecting the cutting line X corresponding to the dimension of the laminate chip 10. As a result, the laminate chip 10 is manufactured. It should be noted that, in the present preferred embodiment, the cutting line Y is perpendicular or substantially perpendicular to the cutting line X.

Side Gap Portion Forming Step S15

Next, a ceramic slurry in which Mg is added as a sintering aid to the dielectric powder, which is the same or substantially the same as that of the inner layer ceramic green sheet 101, is prepared. Then, the ceramic slurry is applied on a resin film, and dried to manufacture a side gap portion ceramic green sheet. It should be noted that a plurality of side gap portion ceramic green sheets may be manufactured.

Then, the side gap portion ceramic green sheet is affixed on the side portion where the internal electrode layers 15 of the laminate chip 10 are exposed, such that a layer defining and functioning as the side gap portion 20 is formed.

Thus, the side gap portion 20 is affixed to the LT side surface of the laminate chip 10, such that the multilayer body 2 in a state before firing is formed.

Firing Step S16

The layer defining and functioning as the side gap portion 20 is formed in the laminate chip 10, and the resultant body is subjected to degreasing treatment in a nitrogen atmosphere under a predetermined condition, and then fired and sintered at a predetermined temperature in a nitrogen-hydrogen-steam mixed atmosphere to form the multilayer body 2.

Since the side gap portion 20 is affixed to the laminate chip 10 including the dielectric layers 14, there is an interface between the side gap portion 20 and the laminate chip 10 even after firing.

Here, a Ni—Mg alloy, which is an alloy of Mg included in the side gap portion 20 and Ni included in the outer layer portion 12, is segregated in the boundary region Z2 between the side gap portion 20 and the outer layer portion 12. The boundary region Z2 tends to become the penetration path of moisture. Therefore, the pores existing in this portion are filled, and the moisture resistance becomes high.

Here, as shown in FIG. 4, since Ni is included in the outer layer portion 12, particles of the dielectric ceramic after firing are densified. Furthermore, since the pores provided in the dielectric ceramic in the outer layer portion 12 are filled with Ni, moisture resistance of the multilayer ceramic capacitor 1 is increased.

As shown in FIG. 5, the Sn-layer 16 which has migrated from the interior to the surface is formed on the surfaces of the internal electrode layers 15.

Barrel Step S2

Next, barrel polishing is performed on the multilayer body 2. As a result, the ridge portion R1 of the multilayer body 2 is rounded.

Since the internal electrode layer 15 shrinks during the firing step S16, a portion of the internal electrode layers 15 may not be exposed at the end surface C. However, since the barrel step S2 is provided, the end surface C of the multilayer body 2 is also polished, such that the number of the internal electrode layers 15 which are not exposed at the end surface C is reduced.

Furthermore, the positional deviation d2 between the end portion which is in the vicinity of the side surface B and located outermost in the width direction W and the end portion which is located innermost in the width direction W among all of the internal electrode layers 15 is, for example, about 10 μm or less.

That is, the end portions in the width direction W of the laminated internal electrode layers 15 are located at the same or substantially the same position in the width direction W. In other words, the positions of the end portions are aligned or substantially aligned in the lamination direction T.

Base Electrode Layer Forming Step S3

The base electrode layer forming step S3 includes a first region forming step S31, a second region forming step S32, a third region forming step S33, and a firing step S34.

FIG. 9 is a diagram showing the base electrode layer forming step S3 and a plated layer forming step S4.

First Region Formation Step S31

In the first region forming step S31, both end surfaces C of the multilayer body 2 are immersed in a glass-containing Cu paste to form the first region 30a. To form the first region 30a, the Cu paste including Cu particles having a small particle size is used. The particle size of the Cu particles is, for example, about 0.05 μm or more and about 3 μm or less.

Furthermore, it is preferable that the thickness is, for example, about 0.05 μm or more and about 1 μm or less.

Here, the positional deviation d of the internal electrode layers 15 in the vicinity of the end surface C is smaller in the barrel step. However, there is a possibility that the positional deviation d remains somewhat in the internal electrode layers 15 in the vicinity of the end surface C.

In the present preferred embodiment, since the Cu paste having a small particle size is used, the Cu paste can enter the portion of the positional deviation d remaining in the internal electrode layers 15 in the vicinity of the end surface C, leading to the favorable contact with the internal electrode layers 15.

Second Region Forming Step S32

Next, in the second region forming step S32, both end surfaces C of the multilayer body 2 are immersed in Cu pastes, each having a higher glass content than that of the first region 30a and the third region 30c, to form the second region 30b.

The second region 30b includes more glass G than the first region 30a and the third region 30c. In the LT cross-section, when the area ratio of glass to Cu in the entire base electrode layer 30 (area of glass/area of Cu) is defined as P, the second region 30b may be defined as a region of, for example, about 1.2P or more. Since the ratio of the glass G in the second region 30b is about 1.2P or more, the sealing property and the moisture resistance are improved.

However, in order to reduce or prevent the deterioration of the conductivity of the second region 30b, the ratio of the glasses G in the second region 30b is preferably, for example, about 2.5P or less.

It should be noted that the particle size of the Cu particles included in the Cu paste may be the same or substantially the same as the particle size of the Cu particles included in the Cu paste, or may be larger than the particle size of the Cu particles included in the Cu paste.

Third Region Forming Step S33

Next, in the third region forming step S33, both end surfaces C of the multilayer body 2 are immersed in a Cu paste having a higher Cu content than the Cu pastes of the second region 30b and the third region 30c, to form the third region 30c. The Cu paste 118 includes glass G. The glass G includes, for example, BaO—B$_2$O$_3$—SiO$_2$ glass or BaO—B$_2$O$_3$—SiO$_2$—LiO—NaO glass including Ba. In addition, sulfur (S) is included in the glass G.

Firing Step S34

Then, the resultant body is heated for a predetermined time in a nitrogen atmosphere at a set firing temperature. As a result, the base electrode layer 30 is burned onto the multilayer body 2.

At this time, the Sn-layer 16 formed on the surfaces of the internal electrode layers 15 extends from the surfaces of the internal electrode layers 15 to the boundary region Z1 between the external electrode 3, and the internal electrode layers 15 and the dielectric layers 14 adjacent to the internal electrode layers 15 in the lamination direction T.

Furthermore, as schematically shown in FIG. 5, Cu in the first region 30a is coupled, and the mass of Cu is larger than the second region 30b and the third region 30c, such that the thickness in the lamination direction T is larger than the thickness of the internal electrode layers 15.

Plated Layer Forming Step S4

The plated layer forming step S4 includes a Ni plated layer forming step S41, and a Sn plated layer forming step S42.

Ni Plated Layer Forming Step S41

In the Ni plated layer forming step S41, the third region 30c of the base electrode layer 30 is immersed in a plating solution for forming the plated layer 31, to form the Ni plated layer 31 on the outer periphery of the external electrode 3.

At this time, the third region 30c includes more Cu than the first region 30a and the second region 30b. The amount of Cu can be measured by calculating the area of Cu detected by WDX. The third region 30c includes more Cu than the second region 30b and the third region 30c. Therefore, the connection ratio when mounting the multilayer ceramic capacitor 1 on a board is preferable.

Here, when the third region 30c of the base electrode layer 30 is immersed in a process liquid in which the plating solution and S (sulfur) are mixed, the mixed process liquid containing the plating solution and S erodes the glass G which is exposed at the surface of the third region 30c.

However, according to the present preferred embodiment, since the glass G includes S and Ba, the S and Ba begin to gradually form the protective layer 33 on the surface of the glass G on which the erosion by the plated layer 31 is progressing.

When the formation of the protective layer 33 progresses, the erosion of the glass G by the plating solution is gradually reduced or prevented, and once the protective layer 33 is formed to have a predetermined thickness, the glass G is hardly eroded.

On the other hand, unlike the present preferred embodiment, if the protective layer 33 is not formed, the plating solution continues to erode the glass G, and advances to the second region 30b and the first region 30a in the interior of the base electrode layer 30.

However, according to the present preferred embodiment, at an initial stage in which the third region 30c of the base electrode layer 30 is immersed in the plating solution in this way, the protective layer 33 is formed by the process liquid including Ba and S included in the glass G. Furthermore, the protective layer 33 defining and functioning as a barrier of the glass G to the plating solution, and thus, further erosion of the glass G by the plating solution is reduced or prevented.

Therefore, it is possible to obtain the multilayer ceramic capacitor 1 in which the erosion of the base electrode layer 30 by the plating solution is small, and the heat resistance, the water resistance, and the moisture resistance are high.

The third region 30c includes Cu in the most amount. Therefore, the Ni plated layer 31a on the outer side is easily adhered thereto. Furthermore, the plated layer 31 overall is hardly peeled off therefrom.

Sn Plated Layer Forming Step S42

Then, the Sn plated layer 31b is formed on the outer side of the Ni plated layer 31a.

Through the above steps, the multilayer ceramic capacitor 1 of the present preferred embodiment is manufactured. Although preferred embodiments of the present invention have been described above, the present invention is not limited to this preferred embodiment, and various modifications may be made within the scope thereof.

For example, in the present preferred embodiment, the base electrode layer 30 is provided with the three regions. However, the present invention is not limited to this, and the base electrode layer 30 may include only the first region 30a and the third region 30c without the second region 30b. Furthermore, the base electrode layer 30 may include only one region.

In the present preferred embodiment, the base electrode layer 30 including the three regions is manufactured by three coating steps of the first region forming step S31, the second region forming step S32, and the third region forming step S33. However, the present invention is not limited to this, and the base electrode layer 30 including a plurality of regions may be manufactured by adjusting the material and the temperature profile, for example.

In the present preferred embodiment, the glass G includes Ba. However, the glass G may not include Ba. In this case, the protective layer 33 does not include Ba. However, the protective layer 33 includes S by the process liquid including S.

In the present preferred embodiment, the Cu paste having a small particle size is used in the barrel step when the first region 30a of the base electrode layer 30. However, the present invention is not limited thereto. In order to improve the connection ratio, for example, either one of performing the barrel step or using a Cu paste having a small size may be used.

In the present preferred embodiment, the multilayer ceramic capacitor 1 is manufactured by manufacturing the laminate chip 10 following which the side gap portions 20 are affixed on both sides of the laminate chip 10. However, the present invention is not limited to this, and the side gap portions 20 may be manufactured together at the time of manufacturing the laminate chip 10.

In the present preferred embodiment, two plated layers are provided. However, the present invention is not limited thereto, and the plated layer may include a single layer.

Furthermore, the size of the multilayer ceramic capacitor 1, and the thickness and the number of layers of the internal electrode layers 15, the dielectric layers 14, the outer layer portions 12, and the external electrodes 3, which are specified in the present preferred embodiment, are not limited to the numerical values described, and may vary therefrom.

Furthermore, the components included in each layer are not limited to those described in the present preferred embodiment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a multilayer body including:
        a plurality of ceramic layers laminated therein;
        a first main surface and a second main surface opposed to each other in a height direction;
        a first side surface and a second side surface opposed to each other in a width direction orthogonal or substantially orthogonal to the height direction;
        a first end surface and a second end surface opposed to each other in a length direction orthogonal or substantially orthogonal to the height direction and the width direction;
        first internal electrode layers alternately laminated with the plurality of ceramic layers and exposed at the first end surface; and
        second internal electrode layers alternately laminated with the plurality of ceramic layers and exposed at the second end surface;
    a first external electrode on the first end surface; and
    a second external electrode on the second end surface; wherein
    a number of the first internal electrodes and the second internal electrodes which are connected to either of the first external electrode and the second external electrode in a cross section in the length direction and the height direction at a middle portion in the width direction is larger than a number of the first internal electrodes and the second internal electrodes which are not connected to either of the first external electrode and the second external electrode.

2. The multilayer ceramic capacitor according to claim 1, wherein at least a portion of the first internal electrode layers and the second internal electrode layers includes pores.

3. The multilayer ceramic capacitor according to claim 1, wherein a distance between end portions in the width direction of the first internal electrode layers and the second internal electrode layers adjacent to each other in the height direction is about 5 µm or less.

4. The multilayer ceramic capacitor according to claim 1, wherein a ratio of the number of the first internal electrodes and the second internal electrodes which are not connected to either of the first external electrode and the second external electrode in a cross section in the length direction and the height direction at an end portion in the width direction to the number of the first internal electrodes and the second internal electrodes which are connected to either of the first external electrode and the second external electrode is about 10% or less.

5. The multilayer ceramic capacitor according to claim 1, wherein a metal included in the first internal electrode layers and the second internal electrode layers is included in a higher density on a side adjacent to the first internal electrode layers of the first external electrode and on a side adjacent to the second internal electrode layers of the second external electrode, than a portion other than the side adjacent to the first internal electrode layers of the first external electrode and a portion other than the side adjacent to the second internal electrode layers of the second external electrode.

6. The multilayer ceramic capacitor according to claim 1, wherein the plurality of ceramic layers each have a thickness of about 0.4 µm or more and about 0.6 µm or less.

7. A multilayer ceramic capacitor comprising:
    a multilayer body including:
        a plurality of dielectric layers and a plurality of internal electrode layers that are laminated;
        a first surface and a second surface opposed to each other in a first direction;
        a third surface and a fourth surface opposed to each other in a second direction intersecting the first direction; and
        a fifth surface and a sixth surface opposed to each other in a third direction intersecting the first direction and the second direction;
    a first external electrode on the fifth surface; and
    a second external electrode on the sixth surface; wherein
    the plurality of internal electrode layers include a plurality of first internal electrode layers that extend to the fifth surface and are connected to the first external electrode, and a plurality of second internal electrode layers that extend to the sixth surface and are connected to the second external electrode, and a number of internal electrode layers which are not connected to either of the first external electrode and the second external electrode; and
    when the multilayer body is viewed in a cross section in the first direction and the third direction at a middle portion of the multilayer body in the second direction, a ratio of the number of the internal electrode layers which are not connected to either of the first external electrode and the second external electrode to a total number of the internal electrode layers is about 10% or less.

8. The multilayer ceramic capacitor according to claim 7, wherein at least a portion of the first internal electrode layers and the second internal electrode layers includes pores.

9. The multilayer ceramic capacitor according to claim 7, wherein a distance between end portions in the second direction of the first internal electrode layers and the second internal electrode layers adjacent to each other in the first direction is about 5 μm or less.

10. The multilayer ceramic capacitor according to claim 7, wherein a ratio of a number of the first internal electrodes and the second internal electrodes which are not connected to either of the first external electrode and the second external electrode in a cross section in the third direction and the first direction at an end portion in the second direction to a number of the first internal electrodes and the second internal electrodes which are connected to either of the first external electrode and the second external electrode is about 10% or less.

11. The multilayer ceramic capacitor according to claim 7, wherein a metal included in the first internal electrode layers and the second internal electrode layers is included in a higher density on a side adjacent to the first internal electrode layers of the first external electrode and on a side adjacent to the second internal electrode layers of the second external electrode, than a portion other than the side adjacent to the first internal electrode layers of the first external electrode and a portion other than the side adjacent to the second internal electrode layers of the second external electrode.

12. The multilayer ceramic capacitor according to claim 7, wherein the plurality of ceramic layers each have a thickness of about 0.4 μm or more and about 0.6 μm or less.

13. A multilayer ceramic capacitor comprising:
a multilayer body including:
a plurality of ceramic layers laminated therein;
a first main surface and a second main surface opposed to each other in a height direction;
a first side surface and a second side surface opposed to each other in a width direction orthogonal or substantially orthogonal to the height direction;
a first end surface and a second end surface opposed to each other in a length direction orthogonal or substantially orthogonal to the height direction and the width direction;
first internal electrode layers alternately laminated with the plurality of ceramic layers and exposed at the first end surface; and
second internal electrode layers alternately laminated with the plurality of ceramic layers and exposed at the second end surface;
a first external electrode on the first end surface; and
a second external electrode on the second end surface; wherein
a ratio of a total number of the first internal electrode layers and the second internal electrode layers which are not connected to either of the first external electrode and the second external electrode in a cross section in the length direction and the height direction at a middle portion in the width direction to a total number of the first internal electrode layers and the second internal electrode layers is 0% or more and 10% or less.

14. The multilayer ceramic capacitor according to claim 13, wherein at least a portion of the first internal electrode layers and the second internal electrode layers includes pores.

15. The multilayer ceramic capacitor according to claim 13, wherein a distance between end portions in the width direction of the first internal electrode layers and the second internal electrode layers adjacent to each other in the height direction is about 5 μm or less.

16. The multilayer ceramic capacitor according to claim 13, wherein a ratio of a total number of the first internal electrodes and the second internal electrodes which are not connected to either of the first external electrode and the second external electrode in a cross section in the length direction and the height direction at an end portion in the width direction to a total number of the first internal electrodes and the second internal electrodes which are connected to either of the first external electrode and the second external electrode is about 10% or less.

17. The multilayer ceramic capacitor according to claim 13, wherein a metal included in the first internal electrode layers and the second internal electrode layers is included in a higher density on a side adjacent to the first internal electrode layers of the first external electrode and on a side adjacent to the second internal electrode layers of the second external electrode, than a portion other than the side adjacent to the first internal electrode layers of the first external electrode and a portion other than the side adjacent to the second internal electrode layers of the second external electrode.

18. The multilayer ceramic capacitor according to claim 13, wherein the plurality of ceramic layers each have a thickness of about 0.4 μm or more and about 0.6 μm or less.

* * * * *